United States Patent [19]
Goad et al.

[11] 3,988,820

[45] Nov. 2, 1976

[54] TOOL FOR THE REMOVAL OF AUTOMOTIVE IGNITION LOCK ASSEMBLIES

[75] Inventors: Carl H. Goad; William F. Hall, both of Albuquerque, N. Mex.

[73] Assignee: Charles J. Granone, Albuquerque, N. Mex.

[22] Filed: Aug. 14, 1975

[21] Appl. No.: 604,675

[52] U.S. Cl. .................. 29/244; 81/3 R

[51] Int. Cl.$^2$ .................. B23P 19/04

[58] Field of Search .................. 29/244, 234, 237, 282, 29/200 D; 81/3 R

[56] References Cited

UNITED STATES PATENTS

| | | | |
|---|---|---|---|
| 2,215,015 | 9/1940 | Richard | 81/3 R |
| 2,629,274 | 2/1953 | Bolduc | 81/3 R |
| 2,732,739 | 1/1956 | Liss | 81/3 R |
| 2,906,148 | 9/1959 | Mikeska | 81/3 R |

*Primary Examiner*—James L. Jones, Jr.

*Attorney, Agent, or Firm*—John J. Byrne; Edward E. Dyson

[57] ABSTRACT

A device for removing a cylindrical ignition lock bolt from a chamber formed in the steering column housing of the type wherein the lock bolt has extending therefrom a radially biased detent engaging a recess formed in the lock chamber wherein the device urges a pair of elongated shims to depress the detent from its engaging position to facilitate the withdrawal of the lock bolt from the chamber.

1 Claim, 13 Drawing Figures

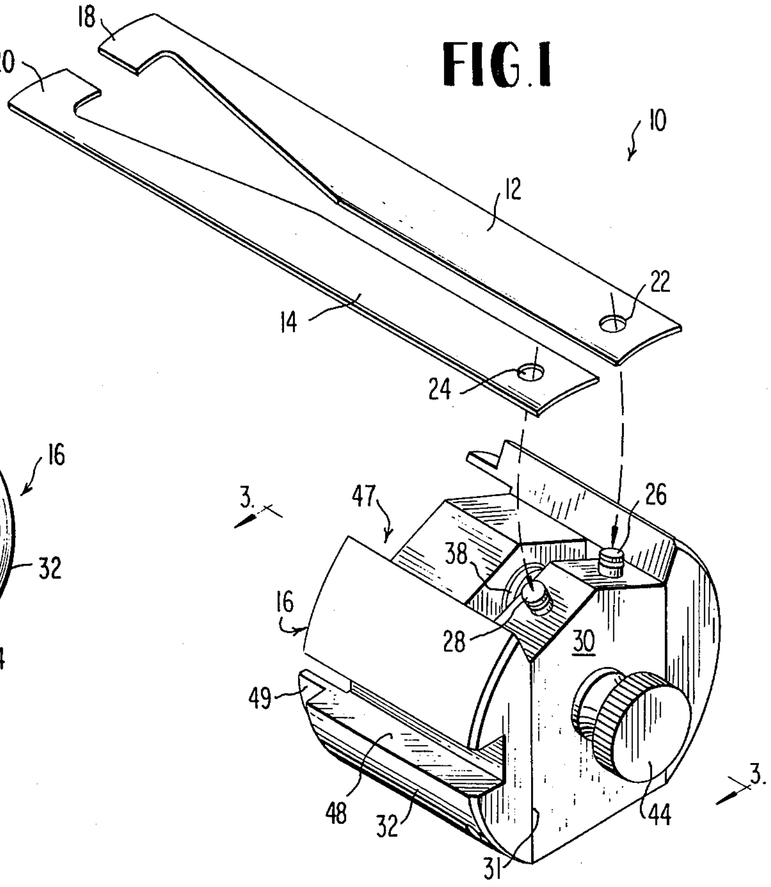
FIG.1
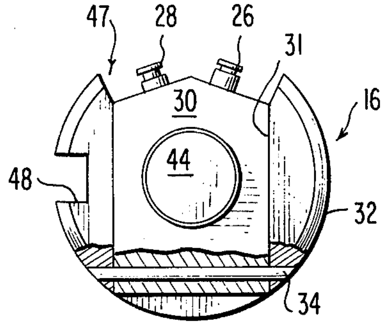
FIG.2
FIG.3
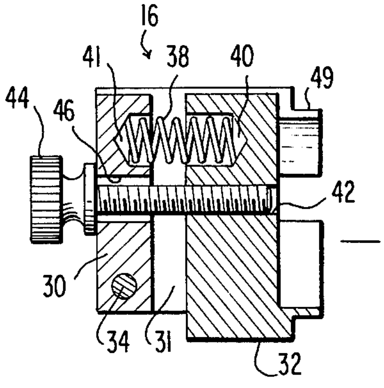
FIG.3a
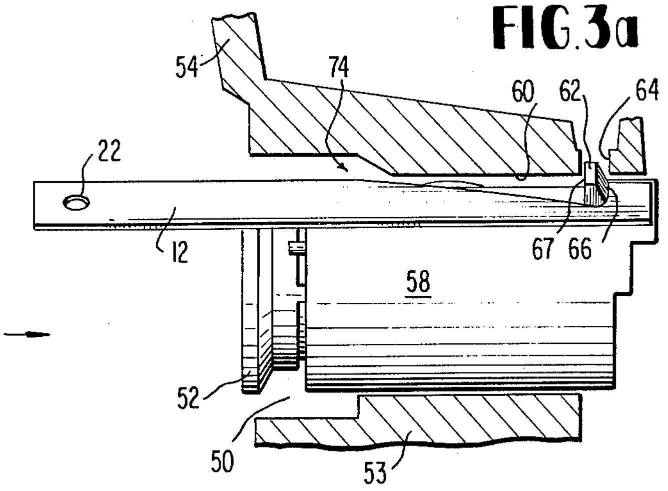
FIG.4
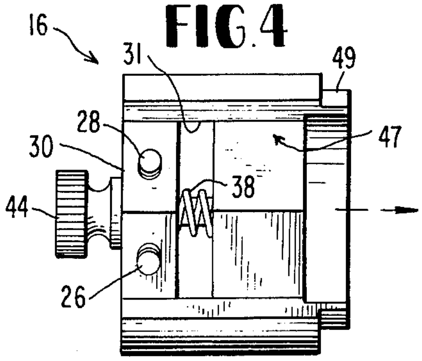
FIG.4a
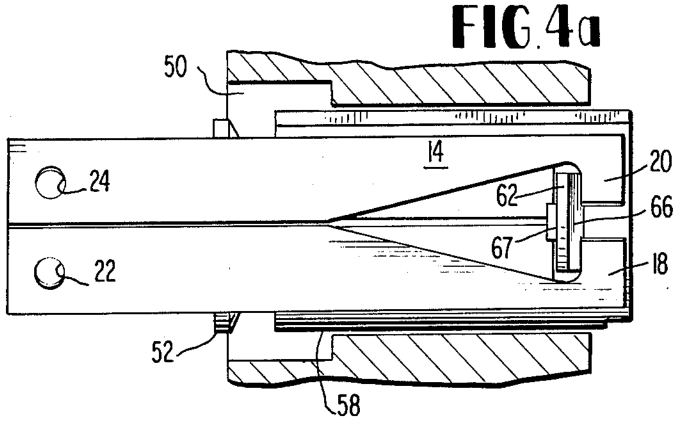

TOOL FOR THE REMOVAL OF AUTOMOTIVE IGNITION LOCK ASSEMBLIES

BACKGROUND OF THE INVENTION

1. Field of the Invention.

This invention is related to the art of removing cylinder locks of the type wherein the cylinder lock bolt is retained within a chamber by means of a radially biased detent. More particularly, this invention is related to a method and a device for depressing such detent and enabling the withdrawal of the lock assembly from the lock chamber formed in the steering column housing of a motor vehicle.

SUMMARY OF THE INVENTION

Many models of motor vehicles incorporate a steering column locking mechanism which requires that the ignition cylinder lock be mounted within the steering column housing in a cooperative fashion. Mounting the lock assembly in this manner places the code numbers by which locksmiths prepare duplicate keys in an inaccessible position. Using present techniques, extensive damage must be caused to the column housing in order to obtain access to the code numbers. Frequently, the column housing must be replaced after the operation. Using the tool and techniques of this invention, the cylindrical lock bolt can be removed in a simple manner with little or no damage to the steering column housing.

The primary objective of this invention is to provide a tool by which the cylinder lock bolt can be removed from the steering column housing without causing extensive damage.

It is another objective of this invention to provide a tool by which the radially biased detent extending from the lock bolt can be depressed, thereby enabling the user to easily withdraw the lock assembly from the housing.

It is still another objective of this invention to provide a means by which tension is applied to a pair of inwardly directed shims thereby urging the shims to act upon the biased detent of the cylindrical lock bolt causing the detent to depress from engagement with a recess in the bolt housing.

Another objective of this invention is to provide a tool by which a locksmith may gain easy access to the key code numbers inscribed on the cylindrical lock bolt.

These and other advantages and objectives will become more obvious to those skilled in the art when viewed in light of the accompanying drawings and specification.

DESCRIPTION OF THE DRAWINGS

FIG. 1 is an exploded perspective view of the invention;

FIG. 2 is a partial cut-away end view of the back face of the device in FIG. 1;

FIG. 3 is a cross-section along the line 3—3 of FIG. 1;

FIG. 3*a* is a side elevation showing a positioned shim;

FIG. 4 is a top plan view of FIG. 3;

FIG. 4*a* is a top plan view of FIG. 3*a*;

DESCRIPTION OF AN EMBODIMENT

Figure 6:
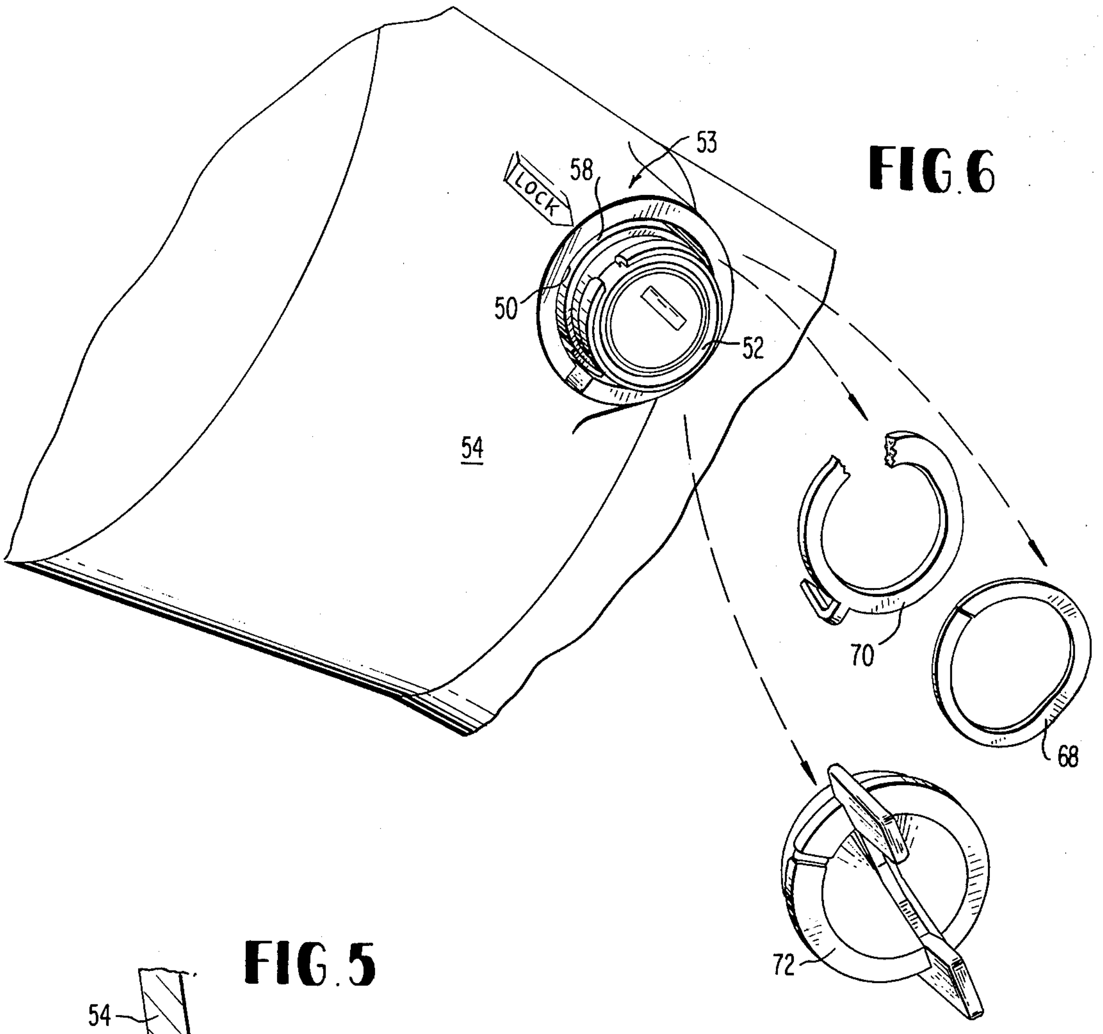
FIG. 6 is an exploded view of the key lock assembly.

Referring now to the drawings wherein like elements are indicated by like numerals, the tool is indicated by the numeral 10. The principal elements of the tool are shims 12 and 14 and a means 16 for applying tension to said shims. Shims 12 and 14 are laterally bowed and have formed at one end thereof inwardly directed flanges 18 and 20. Apertures 22 and 24 are formed at the other end. Apertures 22 and 24 are adapted to receive pins 26 and 28 located on backplate 30 of the assembly 16. Assembly 16 is comprised of a generally cylindrical body 32 and a backplate 30. Body 32 has formed therein a window 31 in which backplate 30 is pivotally mounted about an axle 34 which spans window 31. On the circumferential face of body 32 are formed channels 47 and 48. Channel 47 receives shims 12 and 14 and channel 48 provides access to the lock bolt for auxiliary tools used in a manner set forth below. Assembly 16 is equipped with a spring compression screw 44. Screw 44 passes through an aperture 46 in backplate 30 and into a threaded bore 42 in body portion 32. A spring 38 is received by opposed depressions 40 and 41 and is compressed or expanded through manual rotation of screw 44. A rim 49 extends outwardly from body 32. The rim is segmented in that it is open at channels 47 and 48. Rim 49 acts as a guide and is receivable in mount 50 of a lock chamber 53 formed in steering column housing 54. The lock lip 52 (FIG. 5) is receivable in rim 49.

Figure 5:
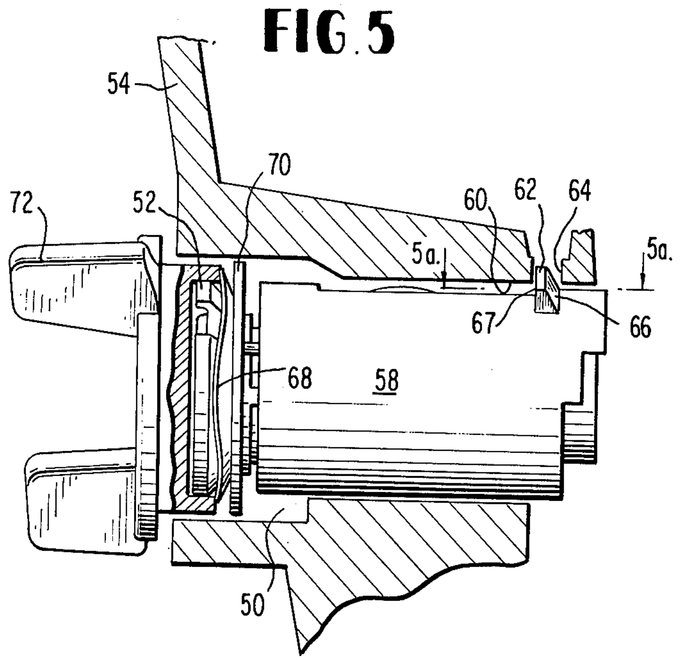
FIG. 5 is a partial cross-section showing a lock assembly in place.
Figure 5A:
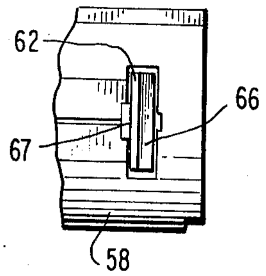
FIG. 5*a* is a view along the line 5*a*—5*a* of FIG. 5.
Figure 7:
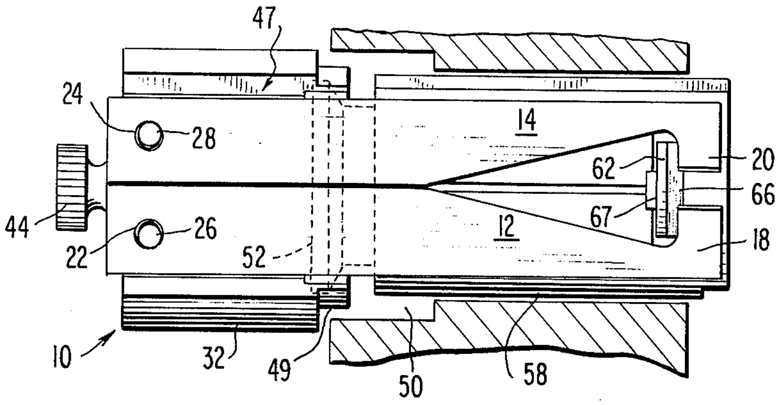
FIGS. 7 through 10 show successive stages of operation.

FIGS. 5 and 6 illustrate a type of lock assembly which may be removed using the device of this invention in accordance with the techniques described herein. The steering column 54 of the automobile is equipped with a lock bolt 58 in a chamber 53. The lock bolt 58 has extending therefrom a radially biased detent 62. During assembly of the automobile or during replacement, the bolt 58 is inserted into chamber 53, and detent 62 is depressed against the bias of a spring. Note, particularly, the front camming surface 66 and the locking surface 67. When fully inserted, lock lip 52 is flush with a rim 55 of chamber 53 and the spring-biased detent 62 extends to engage behind a circumferential slot 64 of chamber 60. Bolt 58 is thus locked in chamber 50. The lock bolt cannot be removed without depressing the detent. Because of the extremely small space between the walls of chamber 60 and the lock bolt 58, it has heretofore been the common practice to drill and destroy the lock bolt because of the inaccessability of the detent. The mechanism herein described provides the means for depressing detent 62.

As shown in the exploded view of FIG. 6, the lock assembly also includes an anti-rattle washer 68, a tang washer 70 and a winged knob 72. Prior to introducing device 10 into the lock housing, washers 68 and 70 and knob 72 are removed. Knob 72 is easily pried from the lock assembly with a screw driver or similar leverage device. Anti-rattle washer 68 and tang washer 70 can be cracked and removed using an appropriately flanged tool.

Figure 8:
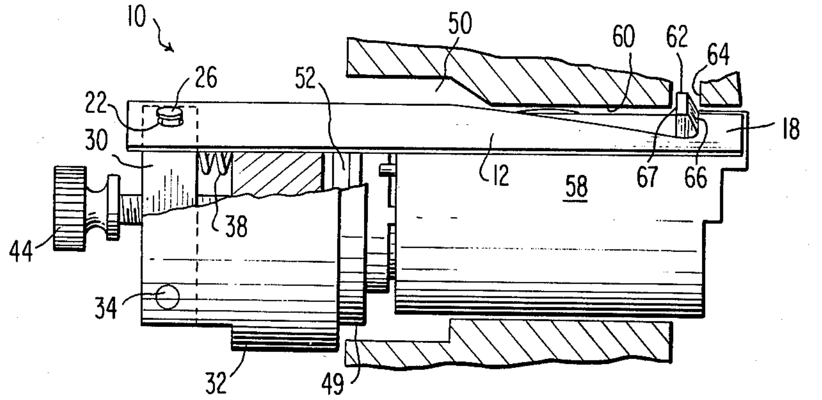
Figure 9:
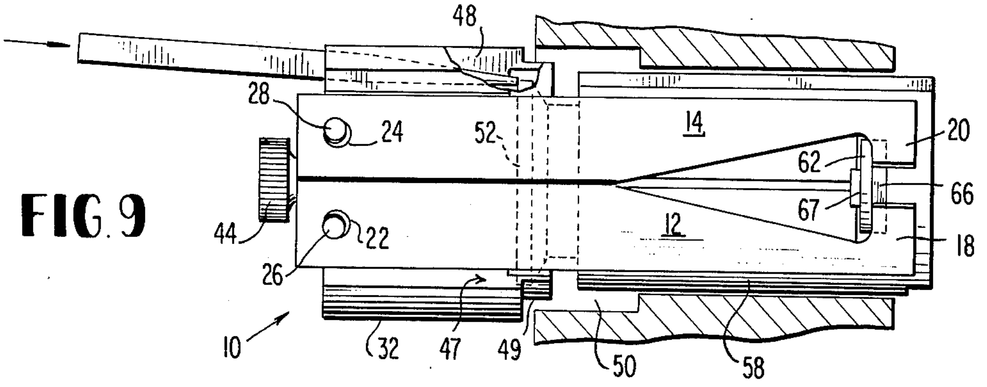
Figure 10:
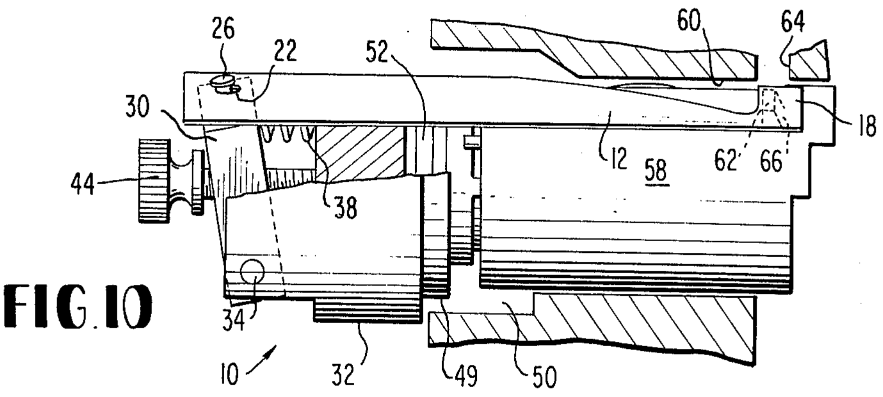

After removal of washers 68 and 70 and knob 72, the righthand shim 12 and lefthand shim 14 are inserted in space 74 between housing 53 and lock bolt 58 and their inwardly directed flanges 18 and 20 slip behind and about detent 62. Assembly 16 is adjusted so that spring 38 is compressed and backplate 30 is flush with window 31 of body portion 32. Assembly 16 is then inserted into mouth 50 and pins 26 and 28 are inserted into apertures 22 and 24. Flanges 18 and 19 can now be pulled toward the user by "backing off" spring compressing screw 42 about two and one-half turns. This adjustment creates a clearance of approximately .08 inches between screw compression screw head 46 and backplate 32. Shims 12 and 14 are urged over cam surface 66 of detent 62 and the lock bolt 58 is jarred with a series of light taps. The awl is inserted through channel 48. The spring 38 urges backplate 32 and shims 12 and 14 to the left in FIGS. 8 and 9 thereby depressing detent 62 and enabling easy withdrawal of bolt 58 from chamber 60. (See FIG. 10).

In a general manner, while there has been disclosed an effective and efficient embodiment of the invention, it should be well understood that the invention is not limited to such an embodiment, as there might be changes made in the arrangement, disposition, and form of the parts without departing from the scope of the accompanying claims.

We claim:

1. A device for removing a cylindrical lock bolt from a steering column of a type having an elongated chamber therein for receiving said lock bolt, said bolt having a spring-biased detent extending radially therefrom, a circumferentially located recess formed in said chamber receiving said detent when said lock bolt is fully inserted and said detent having a camming surface on the inner side thereof and a locking surface on the other side thereof comprising, two elongated shim means extending the length of said bolt, a pair of inwardly directed flanges which engage said cam surface of said detent, a means for applying tension to said shim means and causing said flanges to engage said cam surface and depress said detent to enable the withdrawal of said lock bolt from said chamber.

* * * * *